Jan. 1, 1935.        H. E. BARTSCH        1,986,315
BRAKE OPERATING MECHANISM
Filed July 26, 1933        2 Sheets-Sheet 1
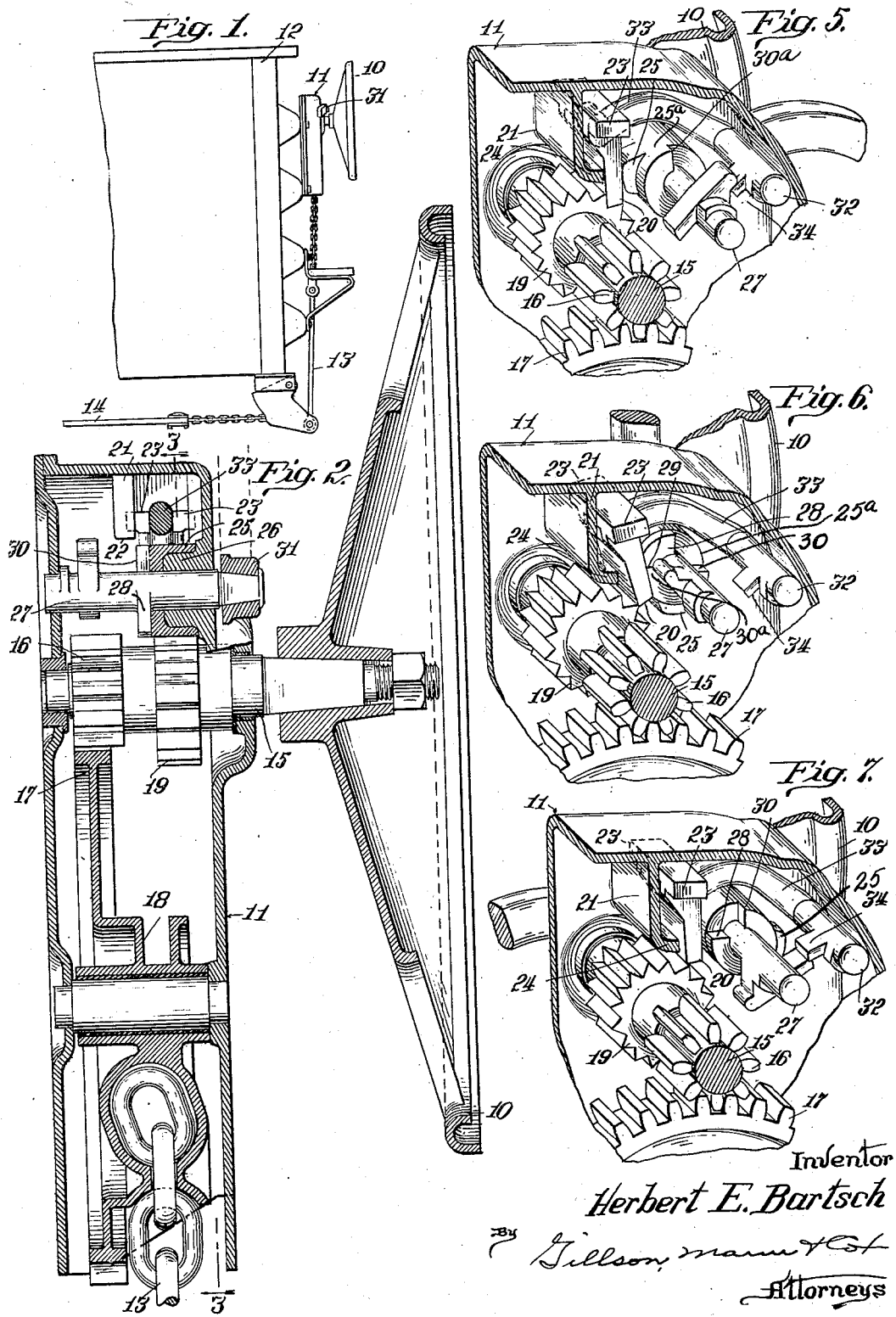
Inventor
Herbert E. Bartsch Jan. 1, 1935.   H. E. BARTSCH   1,986,315
BRAKE OPERATING MECHANISM
Filed July 26, 1933   2 Sheets-Sheet 2
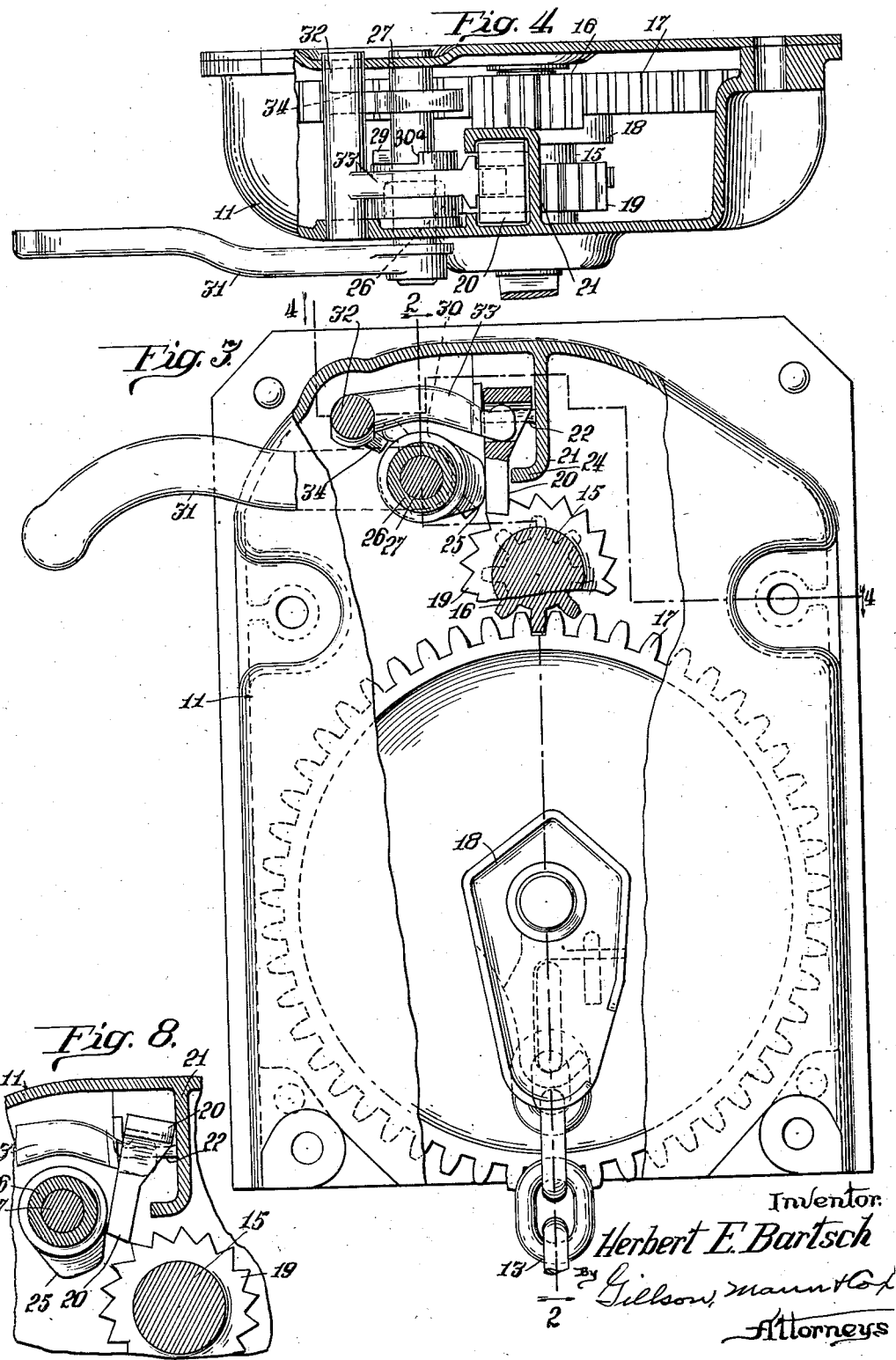

Patented Jan. 1, 1935

1,986,315

UNITED STATES PATENT OFFICE 1,986,315

BRAKE OPERATING MECHANISM

Herbert E. Bartsch, Chicago, Ill., assignor to Universal Draft Gear Attachment Co., a corporation of Illinois Application July 26, 1933, Serial No. 682,308

5 Claims. (Cl. 188—81.1)

The invention relates to mechanism for operating high power hand brakes for railway cars, and the improvement resides especially in the mechanism for controlling the holding means. There is illustrated, and hereinafter described, one of various possible forms of embodiment of the invention.

In the accompanying drawings

Fig. 1 is a detail side elevation of a railway car showing the application thereto of the brake operating mechanism;

Fig. 2 is a detail sectional view of the operating mechanism taken on the line 2—2 of Fig. 3;

Fig. 3 is a detail sectional view of the operating mechanism taken on the line 3—3 of Fig. 2;

Fig. 4 is a sectional view of such mechanism taken on the line 4—4 of Fig. 3, and Figs. 5, 6, 7, and 8 are details of the mechanism for holding and releasing the brake, showing the parts in different positions.

In high power hand brakes it is common to employ a pivoted pawl cooperating with a ratchet wheel for holding the brakes in set position. This mechanism is not satisfactory for several reasons, among others it is subject to rapid wear; it is not entirely reliable when new, and increasingly unreliable as wear occurs. It is difficult to release as the pawl must be lifted while sustaining the entire load which has been put upon it, unless the pressure be relieved by a further turning of the hand wheel in the winding-up direction. These objectionable features are entirely removed in the device of this application.

The brake actuating mechanism of the present device is of usual construction, comprising a hand wheel 10 and a gear box 11 mounted upon the end of a car 12 and actuating the brake by means of a flexible connection 13, 14. The hand wheel is fixed upon a shaft 15 journaled in the walls of the box 11 and carrying a pinion 16 which meshes with a gear 17 mounted, or, as shown, integral with a winding drum 18 also housed within the box and to which is attached the end of the draw chain which is connected with the brake.

A ratchet wheel 19 is fixed upon the shaft 15 and with it cooperates a holding pawl 20. This pawl is in the form of a bar adapted to make end contact with the ratchet wheel when approaching it substantially radially and is carried within a housing 21 mounted within the casing 11 and having supporting shoulders, as 22, upon which laterally projecting shoulders, as 23, of the pawl rest and between which the body of the pawl may move vertically.

The pawl is shown in normal position for service in Fig. 5, in which position it is held against swaying motion by a rigid arm 24 engaging one of its faces and a movable abutment 25 engaging its opposite face, but is free to move longitudinally between these two limiting devices. As the shaft 15 is turned for setting up the brake, the pawl will click over the teeth of the ratchet, and when the turning movement is suspended the full load will be transmitted to the abutment 25 from the radial face of a ratchet tooth bearing against the pawl laterally and thence to the housing 11. The abutment 25 is formed on the periphery of a casting 25ª, loosely sleeved upon a shaft 27 journaled in the front and rear walls of the housing, and journaled on a boss 26 formed on the front wall thereof. The front radial face of the casting 25ª is provided with oppositely facing radial shoulders 30, 30ª, engageable, respectively, by shoulders 28, 29, formed on the shaft 27. The shaft 27 projects beyond the front wall of the casing and carries a controlling handle 31. When the handle 31 is in the position of Fig. 3 the abutment 25 is held in engagement with the pawl 20. When it is thrown over to the right the abutment will be turned to the position shown in Fig. 8 by the shoulder 29 in engagement with the shoulder 30ª and the pawl will click over the ratchet teeth when the wheel is rotated in either direction.

When the abutment is in the position of Figs. 3 and 5 while the pawl is held against lateral movement, it is free to move longitudinally and consequently will click over the ratchet teeth when the wheel is rotated to the left, as viewed in Fig. 5, for setting up the brake, but will hold the wheel against recession by reason of the engagement of the radial face of one of the teeth with its side face.

When the parts are in release position, as shown in Fig. 6, the handle 31 having been thrown to the right a sufficient distance to disengage the abutment 25 from the pawl, the latter remains in clicking engagement with the ratchet wheel, and an inexperienced operator might be deceived by the clicking noise into assuming that the parts were in position for setting up the brake. In order to avoid such error a second shaft 32 is journaled in the front and rear walls of the casing 11 and carries an arm 33 taking under the pawl shoulders 23, and a finger 34 engageable by the lugs on the shaft 27 for turning the shaft 32 to raise and lower the pawl, when the handle 31 is thrown to its extreme positions.

While there has been shown and described a preferred form of construction, various changes in detail may be made within the scope of the appended claims.

I claim as my invention:

1. In a brake control mechanism, in combination, an operating shaft, a ratchet wheel associated therewith, a pawl for holding the wheel and mounted for longitudinal and swaying movements, and releasable means for locking the pawl against swaying movement during the setting up of the ratchet.

2. In a brake control mechanism, in combination, an operating shaft, a ratchet wheel associated therewith, a pawl for holding the wheel and mounted for longitudinal and swaying movements, an oscillatable abutment for supporting the pawl against lateral movement by the ratchet teeth, and means for turning the abutment out of engagement with the pawl.

3. In a brake control mechanism, in combination, an operating shaft carrying a ratchet wheel, a retaining pawl cooperating with the wheel and having longitudinal movement in clicking over the teeth, and oscillatory movement substantially normal to the holding faces of the teeth on release.

4. In a brake control mechanism, in combination, an operating shaft, a ratchet wheel fixed thereon, a retaining pawl cooperating with the wheel and having thrust engagement with the camming faces of the teeth thereof and lateral engagement with the holding faces of such teeth, a movable abutment for holding the pawl against lateral movement, and means for moving the abutment out of engagement with the pawl.

5. In a brake control mechanism, in combination, an operating shaft, a ratchet wheel fixed thereon, a retaining pawl cooperating with the wheel and having thrust engagement with the camming faces of the teeth thereof and lateral engagement with the holding faces of such teeth, a movable abutment for holding the pawl against lateral movement, means for moving the abutment out of engagement with the pawl, and means for moving the pawl longitudinally out of engagement with the wheel.

HERBERT E. BARTSCH.